United States Patent
Flashaar et al.

(10) Patent No.: US 9,657,954 B2
(45) Date of Patent: May 23, 2017

(54) TEMPERATURE CONTROL OF A CIRCULATION FLUID SYSTEM BY THERMALLY OPTIMISED OPERATION OF A CIRCULATION PUMP

(75) Inventors: Sebastian Flashaar, Handeloh-Hoeckel (DE); Axel Schreiner, Bremen (DE); Michael Rempe, Hamburg (DE); Erika Lourdes Sander, Luebeck (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 411 days.

(21) Appl. No.: 13/539,592

(22) Filed: Jul. 2, 2012

(65) Prior Publication Data

US 2013/0000732 A1 Jan. 3, 2013

Related U.S. Application Data

(60) Provisional application No. 61/503,384, filed on Jun. 30, 2011.

(30) Foreign Application Priority Data

Jun. 30, 2011 (DE) .......... 10 2011 106 177

(51) Int. Cl.
F24D 19/10 (2006.01)
F24D 17/00 (2006.01)
(Continued)

(52) U.S. Cl.
CPC .......... F24D 19/1051 (2013.01); B64D 11/02 (2013.01); F24D 17/0078 (2013.01);
(Continued)

(58) Field of Classification Search
CPC . B03B 7/078; F24D 19/1051; F24D 17/0078; F24D 19/1012; Y02B 30/745; E03B 7/078
(Continued)

(56) References Cited

U.S. PATENT DOCUMENTS

| 4,945,942 | A | * | 8/1990 | Lund | 137/337 |
| 4,976,098 | A | * | 12/1990 | Meyer et al. | 57/308 |
| 5,158,436 | A | * | 10/1992 | Jensen et al. | 417/32 |
| 5,261,440 | A | * | 11/1993 | Frank | 137/209 |
| 5,303,739 | A | * | 4/1994 | Ellgoth et al. | 137/899.2 |
| 5,309,938 | A | * | 5/1994 | Ellgoth et al. | 137/334 |
| 5,769,124 | A | * | 6/1998 | Ehrhardt | 137/625.47 |

(Continued)

FOREIGN PATENT DOCUMENTS

| DE | 4202719 A1 | 8/1993 |
| DE | 10313876 A1 | 11/2001 |

(Continued)

OTHER PUBLICATIONS

European Patent Office, European Search Report for European Patent Application No. 12174098.9 mailed Feb. 19, 2016.

*Primary Examiner* — Mary McManmon
*Assistant Examiner* — Nicole Wentlandt
(74) *Attorney, Agent, or Firm* — Lorenz & Kopf, LLC

(57) ABSTRACT

A thermally optimised circulation fluid system is proposed which comprises a circulation line, a circulation pump unit and a control unit. The circulation pump unit and the circulation line together form a circulation circuit. The circulation pump unit is configured for transferring an amount of thermal energy directly or indirectly to a fluid located in the circulation line. The control unit is configured for adjusting the amount of thermal energy which is transferrable to the fluid.

10 Claims, 3 Drawing Sheets

(51) Int. Cl.
*B64D 11/02* (2006.01)
*F24J 3/00* (2006.01)

(52) U.S. Cl.
CPC .......... *F24D 19/1012* (2013.01); *F24J 3/003* (2013.01); *F24D 2200/16* (2013.01); *F24D 2200/29* (2013.01); *F24D 2200/30* (2013.01); *F24D 2220/0207* (2013.01); *Y02B 30/745* (2013.01); *Y02T 50/46* (2013.01); *Y10T 137/0318* (2015.04); *Y10T 137/6579* (2015.04); *Y10T 137/6855* (2015.04)

(58) Field of Classification Search
USPC .................. 122/26; 126/247; 417/26, 32; 137/899.2
See application file for complete search history.

(56) References Cited

U.S. PATENT DOCUMENTS

| | | | |
|---|---|---|---|
| 5,979,435 A * | 11/1999 | Puett, Jr. | 126/247 |
| 6,474,951 B2 * | 11/2002 | Stephan et al. | 417/26 |
| 6,766,822 B2 | 7/2004 | Walker | |
| 7,832,421 B2 * | 11/2010 | Laing | 137/337 |
| 8,720,463 B2 * | 5/2014 | Becker et al. | 137/2 |
| 2009/0072980 A1 * | 3/2009 | Cheng | 340/606 |
| 2010/0133155 A1 * | 6/2010 | Nolan | 210/98 |

FOREIGN PATENT DOCUMENTS

| | | | |
|---|---|---|---|
| GB | 2035541 A | 6/1980 | |
| WO | 0042362 A1 | 7/2000 | |

\* cited by examiner

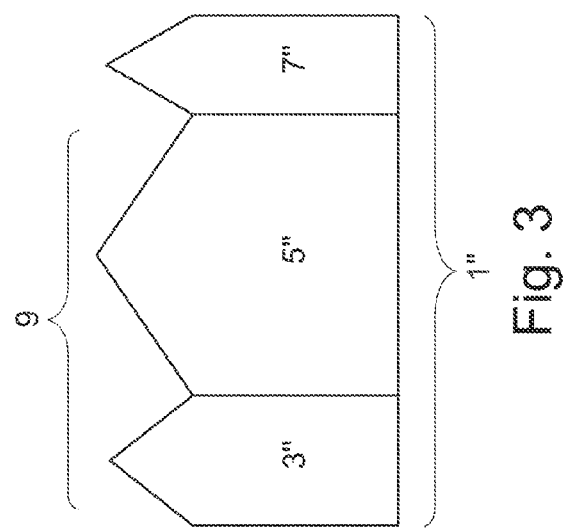
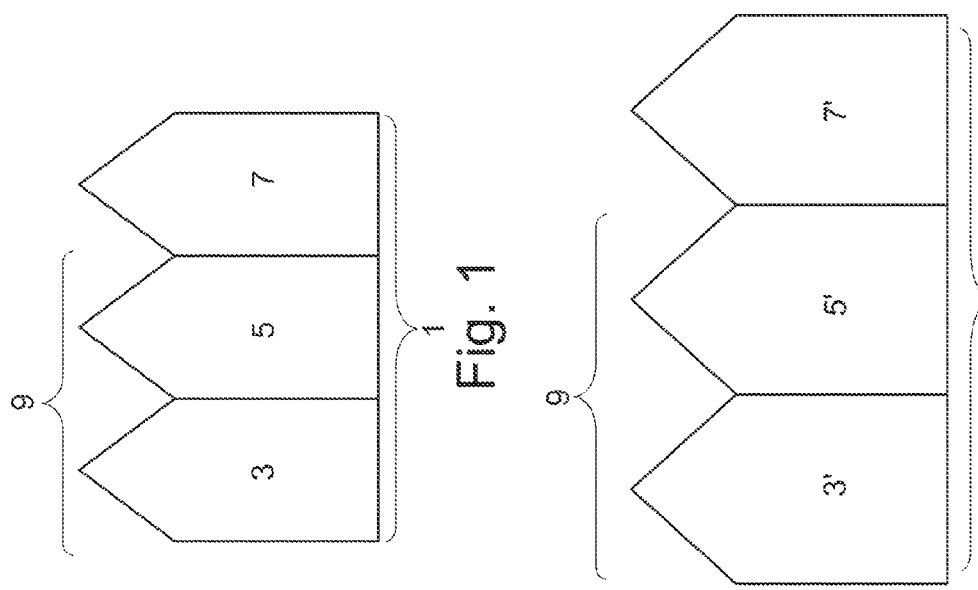

TEMPERATURE CONTROL OF A CIRCULATION FLUID SYSTEM BY THERMALLY OPTIMISED OPERATION OF A CIRCULATION PUMP

CROSS-REFERENCE TO RELATED APPLICATIONS

This application claims priority to German Patent Application No. 10 2011 106 177.4, filed Jun. 30, 2011, and to U.S. Provisional Patent Application No. 61/503,384, filed Jun. 30, 2011, which are each incorporated herein by reference in its entirety.

TECHNICAL FIELD

The technical field relates to a circulation fluid system with temperature control by thermally optimised operation of a circulation pump, to a corresponding method for thermal optimisation of a circulation fluid system and to an aircraft comprising a circulation fluid system.

BACKGROUND

Temperature control of a fluid system may be important in stationary and in movable arrangements. For example, controlling the temperature of a drinking water system on board an aircraft may be important for the comfort and safety of the passengers. On one hand, the drinking water can be heated in order to ensure protection against freezing. On the other hand, the water may not be too warm, in order to avoid accumulation and propagation of germs.

A protection against freezing for a drinking water system of an aircraft may, for example, be ensured by electric pipe trace heaters, which are arranged, for example, in a sleeve-like manner around a drinking water pipe. For example, electric heaters for drinking water systems are known from DE 103 13 876 A1. However, electric pipe trace heaters may require a lot of work during installation and a lot of maintenance.

In addition, water systems comprising a pump which causes circulation of the water in the system and in this way prevents stagnation of the water are known for example from U.S. Pat. No. 6,766,822 B2. The kinetic energy transferred to the water may help to prevent the water from freezing. However, if the outside temperature of the system is below a particular value, the kinetic energy cannot prevent freezing. In addition, when an outside temperature of the system is comparatively high, the kinetic energy additionally transferred to the water may promote contamination of the water.

In addition, other objects, desirable features and characteristics will become apparent from the subsequent summary and detailed description, and the appended claims, taken in conjunction with the accompanying drawings and this background.

SUMMARY

There may therefore be a need for improved controlled and reliable temperature control of a circulation fluid system.

According to various aspects, a thermally optimised circulation fluid system is described. The circulation fluid system comprises a circulation line. A circulation pump unit and the circulation line together form a circulation circuit. The circulation pump unit is configured for transferring an amount of thermal energy directly and/or indirectly to a fluid located in the circulation line. In addition, the control unit is configured for adjusting the amount of thermal energy which is transferrable to the fluid.

In other words, the idea of the present disclosure is based on adjusting or scaling an amount of energy which may be transferred from the circulation pump unit to the pipeline system or to the fluid. For this purpose, the control unit may change various parameters of the system. The amount of energy which is transferrable to the fluid or to the pipeline system may be produced, for example, by suboptimal hydraulic or electric operation of the circulation pump unit. For example, the rotational speed of a pump, the efficiency of a frequency converter of the pump, or the flow cross-section of a valve in the line of the system may be changed. At this, the control unit may, for example, regulate a relationship between a hydraulic power of the pump and the waste heat produced by the pump. Alternatively or additionally, the energy consumption of the pump may be changed, in one example, increased. This may be done, for example, by electrically suboptimal operation of the electric pump drive.

In this way, initially undesirable heating of a circulation pump may be caused at the right time and transferred as waste heat to a fluid located in the system. The heating of the circulation pump is thus advantageously used synergetically for temperature control. In other words, the circulation pump already provided in the system may be used synergetically, not only for increasing pressure and for circulation, but also for heating parts of the pipe installation, in one example, of the circulation line.

As a result, there may no longer be a need for conventional pipe heating by known pipe heaters such as strip heaters, together with the electric installations and control technology required for these, for example cables, plugs, sensors, controllers, etc. In this way, on the one hand a cabling expenditure does not apply and on the other hand weight is saved. A further advantage of the circulation fluid system according to the present teachings is the higher level of safety and simpler configuration management compared to known pipe heating systems.

By the circulation fluid system according to the present disclosure, equalisation between the circulation pump as heat source and heat sinks, for example, at pipelines, may be achieved, such that a system temperature of the fluid of, for example, approximately 6 to about 10° C. may be maintained as long as the ambient temperatures of the water system are not generally higher. This temperature range ensures protection against freezing. In contrast to previously known systems, in this case it is possible to influence the actual state or the current state. This may, for example, be advantageous if, for example, drinking water pipes are guided through regions in which the average temperature level is below approximately 6° C.

In addition, the circulation fluid system according to the present teachings may prevent the system being heated to a relatively high temperature of, for example, over about 16° C. Heating of this type could lead to contamination of the system. By the system according to the present teachings, an uncontrolled heat transfer is avoided and contamination is thus prevented. In other words, by the system according to the present teachings, a hygienically advantageous temperature level may be provided and maintained in a controlled manner.

The thermally optimised circulation fluid system may be, for example, a movable system in a vehicle or an aircraft. The fluid may be a liquid substance. For example, the circulation fluid system may be designed as a water system, in one example, a drinking water system of an aircraft.

The circulation line provided in the system comprises, for example, pipes which, in a stationary system, form a circuit having an additional fluid supply and, in a movable system, may also comprise a reservoir or a holding tank. The circulation line may comprise one or more extraction points at which fluid may be extracted from the system.

The circulation pump unit is configured for circulating the fluid and to increase a pressure of the fluid in the system. The circulation pump unit may comprise a pump, a motor for operating the pump, and a frequency converter for supplying the motor with a corresponding voltage. The pump may, for example, be a positive-displacement pump or a flow pump or a centrifugal pump.

The circulation pump unit is in fluid communication with the circulation line and together therewith forms a circulation circuit. For this purpose, the circulation pump unit may, for example, be integrated into the circulation line.

The circulation pump unit is supplied with a total amount of energy which the circulation pump unit may transfer in various ways. Part of the energy may be transferred to the fluid in the circulation system and a further part may be transferred, for example, to the ambient air. Part of the transferred energy is transferred to the fluid in the form of kinetic energy by the movement of the pump. The kinetic energy is converted into thermal energy by dissipation, partly in the pump itself and within the circulation system. This dissipation energy is proportional to the hydraulic power of the pump. A further portion of the energy transferred by the circulation pump unit may be transferred in the form of thermal energy, also referred to as waste heat. The waste heat may be divided into two different portions: on one hand the portion transferred to the ambient air and on the other hand a heat portion which may be transferred to the fluid of the system, for example, by suboptimal hydraulic or electric operation. Overall, the amount of energy which may be transferred from the circulation pump unit to the fluid or to the circulation system is the difference between the (electric) energy supplied to the circulation pump unit and the energy portion transferred from the circulation pump unit to the ambient air. This controllable amount of energy is adjusted by the control unit.

The amount of thermal energy received by the circulation system may either be received by the fluid directly as waste heat of the circulation pump unit or received indirectly as kinetic energy and converted into thermal energy ("heat") within the circulation system by dissipation. A heat transfer directly at the circulation pump unit may occur, for example, owing to heating of a frequency converter in the circulation pump unit. Additionally or alternatively, heat may be transferred directly at the motor windings. This is possible, for example, when using a flooded pump. In this case, the pump motor may be designed, for example, as a canned motor.

An indirect heat transfer by the circulation pump unit may occur in that a pressure of the fluid in the system is increased, for example, by an increase in the rotational speed of the pump. An indirect heat transfer by the circulation pump unit may occur in that a flow cross-section of a valve arranged in the circulation line is increased such that, for the same pressure at the pump outlet, there is a greater volume flow through the system and thus more energy is introduced into the system or released as (dissipation) heat in the system.

The control unit may for example be a processing unit, for example, a central processing unit (CPU). It may be connected electrically and functionally to the individual system components, such as circulation pump unit, pump, frequency converter, pump motor, valves, and temperature and pressure sensors.

According to one of various exemplary embodiments of the present disclosure, the control unit is configured for adjusting the transferrable amount of thermal energy by operating the circulation pump unit in a hydraulically and/or electrically suboptimal range.

According to another one of various exemplary embodiments, the control unit is configured for adjusting a temperature of the fluid to a predeterminable temperature setpoint value via the adjustable amount of thermal energy. For this purpose, according to another one of various exemplary embodiments of the present disclosure, a temperature sensor may be provided in the circulation fluid system. The temperature sensor is configured for determining a current temperature value of the fluid. Furthermore, the control unit is configured for comparing the current temperature value with the predeterminable temperature setpoint value.

The temperature sensor may be connected to the control device and provided directly in or at the circulation line. The temperature sensor may be configured for determine a temperature value which represents the current temperature of the fluid in the circulation line. For example, the temperature sensor may be arranged at or downstream of a heat sink, such that the lowest temperature in the system is determined Furthermore, a plurality of temperature sensors may be provided in the circulation fluid system.

The determined current temperature value is compared with a predeterminable temperature setpoint value. The temperature setpoint value may, for example, be predefined automatically by the control device or alternatively may be adjusted by a user. Depending on the difference between the currently determined temperature value and the temperature setpoint value, the control unit changes the amount of thermal energy which is transferred from the circulation pump unit to the fluid. In this way, the temperature of the fluid may be controlled. Thus, the amount of thermal energy is adjusted on the basis of the deviation of the current temperature value from the temperature setpoint value.

According to another exemplary embodiment, the circulation pump unit comprises a bypass conduit and a pump. The bypass conduit is configured for diverting a first quantity of fluid from the circulation circuit past the pump. The control unit is configured for adjusting the transferrable amount of thermal energy by controlling the rotational speed of the pump.

The pump may be designed, for example, as a flow pump, in one example as a centrifugal pump. The bypass conduit may be, for example, a bore in the hydraulic conduit of the pump. The bore may have, for example, a variable diameter. Alternatively, the diameter may be constant. This exemplary embodiment corresponds to a hydraulic short circuit of the pump. In order to maintain the same hydraulic power, the rotational speed of the pump can be increased. By increasing the rotational speed of the pump at the same hydraulic power of the circulation pump unit, more energy may, for example, be transferred to the fluid. This occurs, for example, owing to heating of the pump head which is in contact with the fluid and owing to the additional energy dissipation occurring in the bypass conduit and in the pump. Thus, in this exemplary embodiment, the increased energy transfer occurs owing to increased energy dissipation into heat directly in the circulation pump unit and in one example, the pump contained therein.

According to another one of various exemplary embodiments, the bypass conduit comprises a first valve. The control unit is configured for adjusting the transferrable amount of thermal energy by controlling the first quantity of fluid. The control unit is configured for adjusting the first quantity of fluid by controlling the first valve.

The first valve may be, for example, a throttle having a changeable flow cross-section. In addition to adjusting the rotational speed of the pump, the first valve may be regulated in such a way that an optimum amount of energy is transferred to the fluid.

According to another exemplary embodiment of the present disclosure, a frequency converter is provided in the circulation pump unit. The control unit is configured for actuating the frequency converter in such a way that said converter influences the transferrable amount of thermal energy in a targeted manner.

The frequency converter may, for example, produce, from a voltage provided by a supplier, such as a line voltage, or on board an aircraft, a voltage which is suitable for driving a motor of the pump. For example, the frequency converter may be configured for providing a voltage which is changeable in amplitude and frequency. Alternatively, the frequency converter may be configured for providing a pulsed direct voltage. The frequency converter may be actuated by the control unit in such a way that, at a constant rotational speed of the pump and the motor, the frequency converter is operated at a suboptimal operational level and thus produces more heat. This heat may be transferred, for example, through the housing of the frequency converter to the environment and thus to the fluid located in the circulation fluid system. The frequency converter may also be controlled in such a way that the motor windings transfer a greater amount of waste heat at the same rotational speed. In this way, more heat may be transferred directly from the motor windings to the fluid. In this way, in this exemplary embodiment, the increased energy transfer occurs through direct heat transfer from the circulation pump unit to the fluid.

According to another exemplary embodiment of the present disclosure, a heat exchanger is also arranged in the circulation pump unit. This heat exchanger is configured for transferring the predeterminable amount of thermal energy from the frequency converter to the fluid.

For this purpose, a cooling system may be provided, for example, around the housing of the frequency converter. The cooling system receives the waste heat of the frequency converter and passes it on to the heat exchanger, which is in communication with the fluid.

According to yet another exemplary embodiment of the present disclosure, a pump motor having motor windings is also provided in the circulation pump unit. The control unit is configured for actuating the pump motor in such a way that the pump motor produces the predeterminable amount of thermal energy. The motor windings are configured for transferring the predeterminable amount of thermal energy to the fluid.

According to another one of various exemplary embodiments of the present disclosure, a pump is provided in the circulation pump unit. A second valve is also provided in the circulation line. The control unit is configured for adjusting the transferred amount of energy by controlling the rotational speed of the pump at a constant pressure of the fluid at the outlet of the pump through the second valve. The constant pressure may be a predeterminable set pressure.

The circulation line comprises a first cross-section which may be substantially constant or substantially variable. The second valve, which is designed, for example, as a throttle, comprises a second cross-section which is smaller than the first cross-section. The cross-section of the valve may also be referred to as a flow cross-section. In this exemplary embodiment, the second cross-section is substantially variable. For this purpose, a motor, for example, may be connected to the second valve.

In this exemplary embodiment, the energy input is increased owing to the increased volume flow which results when the cross-section of the second valve is enlarged and the pressure in the fluid at the outlet of the pump is kept substantially constant. In this exemplary embodiment, the increased amount of energy which is received owing to increased dissipation within the circulation system is thus converted into thermal energy and thus more heat is transferred indirectly from the circulation pump unit to the fluid.

According to another exemplary embodiment of the present disclosure, a pump is provided in the circulation pump unit. A second valve is also provided in the circulation line. The control unit is configured for adjusting the transferrable amount of thermal energy by controlling the rotational speed of the pump at a constant flow rate of the fluid through the second valve.

The circulation line has a first cross-section which may be substantially constant or substantially variable. The second valve, which is designed for example as a throttle, has a second cross-section which is smaller than the first cross-section. The cross-section of the valve may also be referred to as a flow cross-section. The flow cross-section is directly proportional to the flow rate of the fluid. In this exemplary embodiment, the second cross-section is substantially constant.

The control unit may determine a current pressure, for example, via one or more pressure sensors in the circulation line. By increasing the rotational speed of the pump, a greater kinetic energy and a higher pressure may be transferred to the fluid.

Owing to the smaller cross-section, there is a narrowing at the second valve such that more kinetic energy of the fluid is converted into heat. In this exemplary embodiment, the increased amount of energy received by the circulation pump unit owing to increased dissipation within the circulation system is thus converted into thermal energy and more heat is transferred indirectly from the circulation pump unit to the fluid.

According to another one of various exemplary embodiments of the present disclosure, a pump is provided in the circulation pump unit. The circulation line also comprises a second valve. The control unit is configured for adjusting the transferrable amount of waste heat by controlling the flow rate of the fluid through the second valve at a constant rotational speed of the pump.

In this exemplary embodiment, the increased waste heat is likewise transferred indirectly from the circulation pump unit to the fluid. In contrast to the previous exemplary embodiment, the rotational speed of the pump remains substantially constant, while the flow cross-section of the second valve may be varied by the control unit. For this purpose, a motor, for example, may be connected to the second valve. The control unit may control the flow cross-section of the second valve via the motor. The more the valve is closed, thus the more the flow cross-section decreases, the more waste heat is transferred to the fluid at the valve.

Alternatively, the control unit may adjust the rotational speed of the pump and also the flow rate of the fluid through the second valve.

According to various aspects of the present disclosure, a method for thermal optimisation of an above-described circulation fluid system is described. The method comprises the following: determining a current temperature value of a fluid located in the circulation fluid system; comparing the current temperature value with the predeterminable temperature setpoint value; adjusting, by a control unit, an amount of waste heat which may be transferred to the fluid by a circulation pump unit; the amount of waste heat being adjusted on the basis of a deviation of the current temperature value from the temperature setpoint value.

According to one of various exemplary embodiments of the present disclosure, the method further comprises producing the amount of waste heat by operating the circulation pump unit in a hydraulically and/or electrically suboptimal range.

According to another exemplary embodiment, adjusting the transferrable amount of waste heat comprises increasing a rotational speed of a pump of the circulation pump unit.

According to various aspects of the present disclosure, an aircraft is described which comprises an above-described circulation fluid system and a fluid holding tank. The fluid holding tank, the circulation pump unit and the circulation line may together form a circulation circuit. The fluid holding tank may, for example, be designed as part of the circulation line or be integrated into it. Alternatively, the fluid holding tank may be arranged outside the circulation line and be connected to the circulation circuit, for example, by a line.

According to another exemplary embodiment of the present disclosure, the circulation fluid system is designed as a drinking water system of the aircraft.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 shows schematically an energy flow diagram of the circulation fluid system according to the present teachings in the case of a first adjustment by the control unit;

FIG. 2 shows schematically an energy flow diagram of the circulation fluid system according to the present teachings in the case of a second adjustment by the control unit;

FIG. 3 shows schematically an energy flow diagram of the circulation fluid system according to the present teachings in the case of a third adjustment by the control unit;

DETAILED DESCRIPTION

Figure 4:
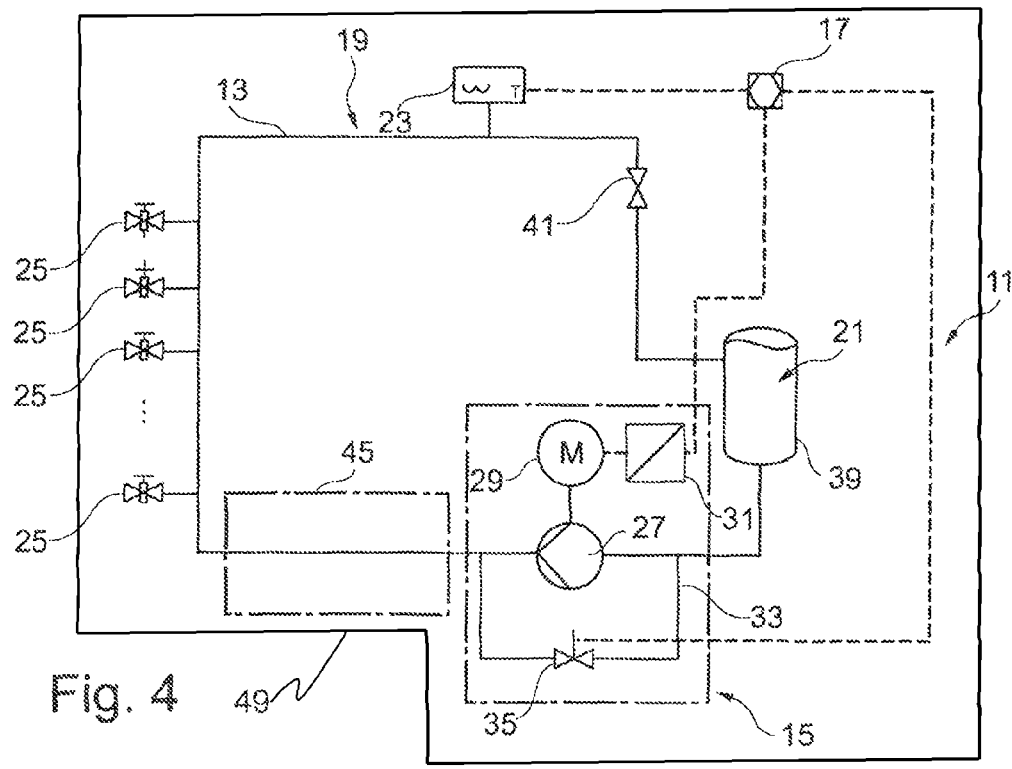
FIG. 4 shows a circulation fluid system in which, in a first exemplary embodiment of the present teachings, an amount of waste heat which is transferrable to the fluid is adjusted by a hydraulic short circuit of the pump.

The following detailed description is merely exemplary in nature and is not intended to limit the present disclosure or the application and uses of the present disclosure. Furthermore, there is no intention to be bound by any theory presented in the preceding background or the following detailed description.

FIGS. 1 to 3 show schematically an energy flow within the circulation fluid system 11. The energy flow diagrams, also referred to as Sankey diagrams, show the total electric energy 1, 1', 1" received by the circulation pump unit 15. This energy 1, 1', 1" may be transferred to the circulation fluid system 11 or the environment in various ways.

A first amount of energy is transferred or passed as kinetic energy 3, 3', 3" from a pump 27 or a circulation pump unit 15 to the fluid 21. A second amount of energy is transferred as thermal energy to the fluid 21. The amount of this thermal energy 5, 5', 5", also referred to as an amount of waste heat, may be adjusted, for example, by suboptimal hydraulic or electric operation of the circulation pump unit 15. The second amount of energy may be supplied to the circulation line 13 or the fluid 21 located therein, for example, by targeted heat transfer from the pump motor 29 or the frequency converter 31. A third amount of energy of the energy 1, 1', 1" received by the circulation pump unit 15 or available to the circulation pump unit 15 is transferred as thermal energy 7, 7', 7" to the ambient air. The amount of the kinetic energy 3, 3', 3" transferred to the fluid 21 may remain substantially constant or be varied.

The total energy 1, 1', 1" available to the circulation pump unit 15 may be changed and can be increased. For example, the total electric energy 1' received by the circulation pump unit 15 in FIG. 2 is greater than the energy 1 received in FIG. 1. In addition, the electric energy 1" received by the circulation pump unit 15 in the exemplary embodiment of FIG. 3 is greater than in FIG. 1. The amount of the electric energy received by the circulation pump unit 15 may be increased, for example, by suboptimal electric and/or suboptimal hydraulic operation of the circulation pump unit 15. For example, the circulation pump unit 15 is operated in the optimal electric and hydraulic range in the exemplary embodiment of FIG. 1 and in the suboptimal range in FIGS. 2 and 3.

Additionally or alternatively, to increasing the total amount of energy available to the circulation pump unit 15, the amount of the thermal energy transferred to the fluid 21 may be increased. This amount of waste heat 5, 5', 5" may be increased, for example, by shifting the ratio between the thermal energy transferred to the environment and the thermal energy transferred to the fluid 21. For example, the energy 1' available to the circulation pump unit 15 overall in FIG. 2 is equal to the energy 1" available overall in FIG. 3. However, in FIG. 3 more thermal energy 5" is transferred to the fluid 21 than in FIG. 2. For this purpose, in FIG. 3 less thermal energy 7" is transferred to the environment or to the ambient air than in FIG. 2. In other words, the control unit 17 may control the operation of the circulation pump unit 15 in the suboptimal electric and/or hydraulic range in such a way that overall more thermal energy 5, 5', 5" is transferred to the fluid or to the pipeline system and less thermal energy 7, 7', 7" is transferred to the environment.

The energy 9, 9', 9" supplied to the fluid 21 overall is made up of the kinetic energy 3, 3', 3" and the thermal energy 5, 5', 5". As shown in FIG. 2, this energy 9, 9', 9" may on one hand be increased by increasing the total amount of the energy 1, 1', 1" available to the circulation pump unit 15. On the other hand, the energy 9, 9', 9" supplied to the fluid 21 overall may be increased by increasing the thermal energy 5, 5', 5" transferred to the fluid at the expense of the thermal energy 7, 7', 7" transferred to the ambient air. To adjust the amount of energy 9, 9', 9" which may be transferred to the fluid, the control unit 17 controls various parameters of the circulation fluid system 11.

FIGS. 4 to 7 show different configurations of the circulation fluid system 11, which are based on different principles for controlling and producing the amount of energy 9, 9', 9" which may be transferred to the fluid 21 overall and in one example, the transferrable amount of thermal energy 5, 5', 5".

FIG. 4 shows a circulation fluid system 11 with temperature control by thermally optimised operation of a circulation pump unit 15. The circulation fluid system 11 is designed as a drinking water system in an aircraft. The circulation fluid system 11 is thus suitable for movable application.

The circulation fluid system 11 comprises a circulation line 13 which, together with a circulation pump unit 15, forms a circulation circuit 19. The circulation line 13 may, for example, include pipes and also comprise a holding tank 39. The circulation pump unit 15 comprises a pump 27, for example, a centrifugal pump, which causes an increase in pressure and circulation of the fluid 21 located in the circulation circuit 19. The fluid 21 is conveyed to one or more extraction points 25 where it may be extracted. Excess fluid is returned to the holding tank 39 via the circulation line 13. If, for example, no drinking water is extracted at the extraction points 25, all the drinking water is returned to the holding tank 39 via the circulation line 13. In order to maintain an admission pressure, a second valve 41, which is designed, for example, as a throttle, may be integrated in the circulation line 13.

In addition to the pump 27, the circulation pump unit 15 comprises a pump motor 29 and a frequency converter 31. The frequency converter 31 may convert a variable voltage provided on board an aircraft into a voltage which is suitable for operation of the pump motor 29. The control unit 17 may, for example, adjust the rotational speed of the pump 27 via a rotational speed or power of the pump motor 29.

Heat sinks 45 may be present in certain regions of the circulation line 13. These Heat sinks may occur, for example, in a drinking water system of an aircraft because the pipelines pass, for example, in the vicinity of an outer skin 49 of the aircraft. The circulation fluid system 11 must thus be heated intermittently or continuously in order to ensure the fluid 21 is protected from freezing. For this purpose, a system temperature should be kept above the freezing temperature of the fluid, for example approximately 6 to about 10° C. In addition, it should be ensured that a hygienically advantageous temperature is provided, such that microbial contamination may be avoided. For this purpose, a temperature of, for example, approximately 12 to about 16° C. may not be exceeded.

The circulation fluid system 11 according to the present disclosure is configured for transferring a scalable amount of energy to the fluid 21. In this way, protection against freezing may be ensured and too high a temperature may be avoided. For this purpose, the circulation fluid system 11 comprises a control unit 17 which is in connected to the individual system components and controls individual parameters in such a way that the amount of energy 9, 9', 9" transferred to the fluid 21, and in one example, the amount of thermal energy 5, 5', 5", adjusts the temperature of the fluid 21 to a predeterminable temperature setpoint value. A temperature sensor 23 is provided in the circulation fluid system 11 and is connected to the control unit 17. The temperature sensor 23 transmits to the control unit 17 a current temperature value of the fluid. The control unit 17 compares the current temperature value with a temperature setpoint value and adapts the parameters of the system accordingly. The parameters are adapted in such a way that the circulation pump unit 15 is operated in a hydraulically or electrically suboptimal range.

In FIG. 4, a hydraulic short circuit is connected in the circulation pump unit 15 for this purpose. In this exemplary embodiment, the hydraulic short circuit is designed as a bypass conduit 33 comprising a first valve 35. In the case of a constant cross-section of the first valve 35, a selected first quantity of fluid at the pump 27 is carried in the short circuit directly from the pump outlet to the pump inlet. The hydraulic power of the pump unit 15 decreases as a result. In order to maintain the hydraulic power of the pump unit 15, the rotational speed of the pump 27 can be increased. Consequently, the pump head, for example, is heated such that an amount of energy 9, 9', 9", in one example, an amount of thermal energy 5, 5', 5", may be transferred to the fluid 21. In addition, the first valve 35 may have a changeable flow cross-section. The amount of energy 9, 9', 9" which may be transferred to the fluid may also be controlled by controlling the first flow rate by the first valve 35. For this purpose, the control unit 17 is in contact with the circulation pump unit 15 and with the first valve 35.

Figure 5:
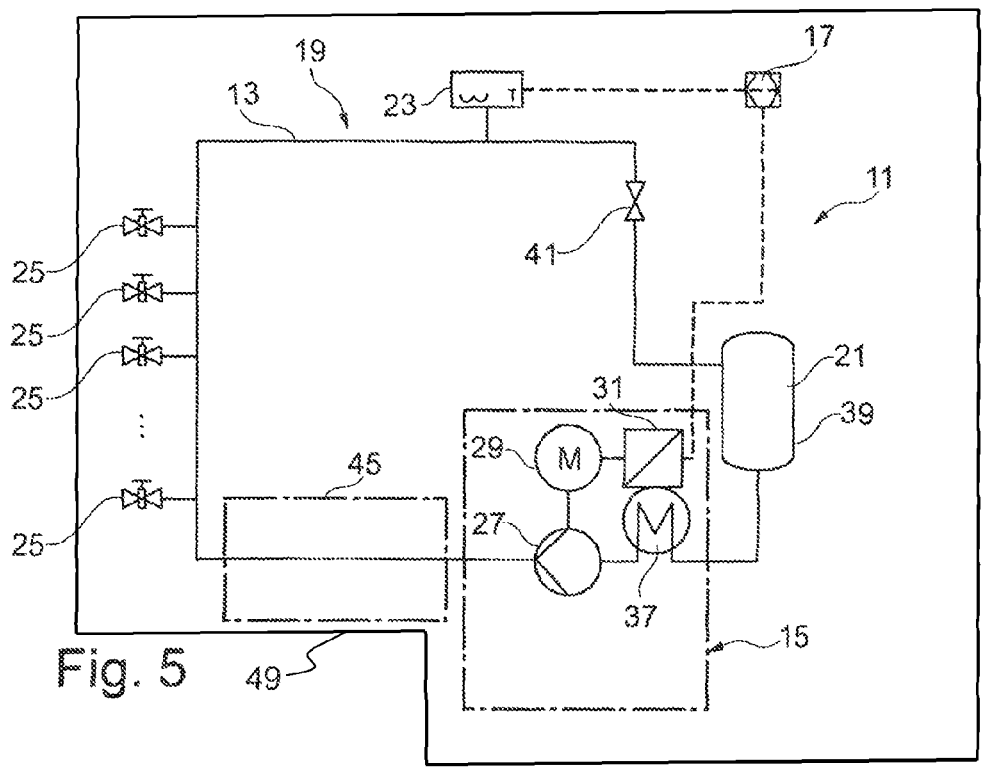
FIG. 5 shows a circulation fluid system in which, according to a another exemplary embodiment of the present teachings, an amount of waste heat which may be transferred to the fluid is adjusted by electrically suboptimal operation of the frequency converter of the pump or of the pump motor.

FIG. 5 shows an alternative possibility for adjusting the transferrable amount of energy 9, 9', 9" and in one example, the transferrable amount of thermal energy 5, 5', 5". In FIG. 5, the transferrable amount of energy 9, 9', 9" is adjusted by selecting a suboptimal operating point of the pump motor 29 or of the frequency converter 31 of the circulation pump unit 15. Therein, the electric efficiency of the motor 29 is influenced, for example. The control unit 17 is connected to the circulation pump unit 15 and in one example, to the frequency converter 31. The control unit 17 may actuate the frequency converter 31 at a predeterminable, sometimes also variable, input frequency in such a way that the frequency converter operates in an electrically suboptimal operating state and thus produces heat. This heat may be received, for example, by a cooling system and transferred to the fluid 21 by a heat exchanger 37 which is provided in the circulation pump unit 15, or, as in the case of a pump motor flooded with the fluid, transferred from the motor windings to the fluid (as for example in the case of a canned motor pump).

Figure 6:
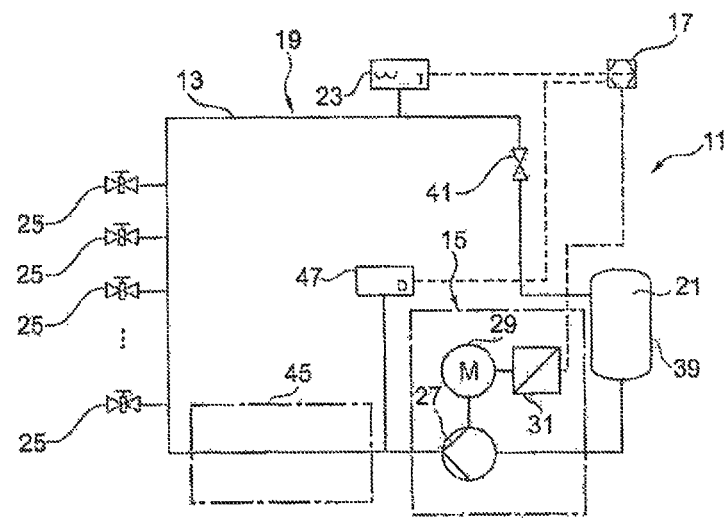
FIG. 6 shows a circulation fluid system in which, according to another exemplary embodiment of the present teachings, an amount of waste heat which is transferrable to the fluid is adjusted by an increase in the rotational speed of the pump.

In the embodiment shown in FIG. 6, the control unit 17 controls the amount of energy 9, 9', 9" which may be transferred to the fluid, and in one example, the transferrable amount of thermal energy 5, 5', 5", by a change in the set pressure of the system or by a change in the rotational speed of the pump 27. For this purpose, the circulation line 13 is provided with a pressure sensor 47 which is configured for transmitting a current system pressure to the control unit 17. By actuating the circulation pump unit 15, the control unit 17 may increase the system pressure. The second valve 41 provided in the circulation line 13 has a smaller flow cross-section than the circulation line 13. When the system pressure is increased or when the rotational speed of the pump 27 is increased, more energy 9, 9', 9" is supplied to the circulation fluid system 11 overall. The higher the system pressure, the more heat is supplied to the system or released in the system by dissipation.

Figure 7:
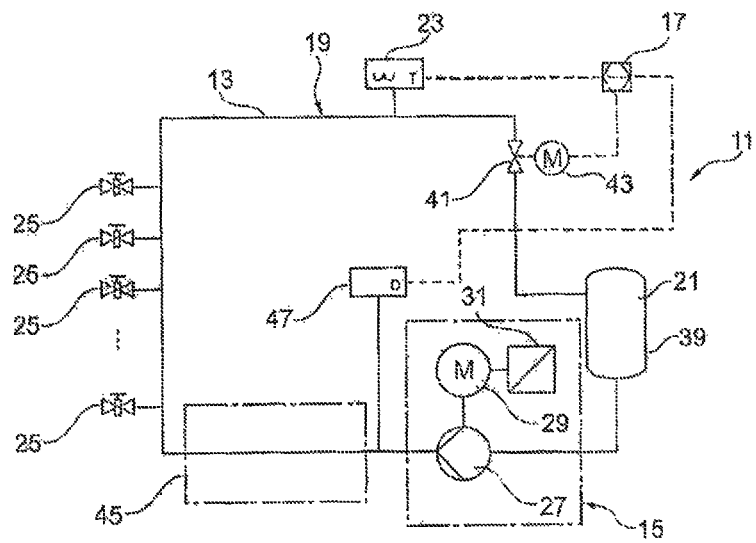
FIG. 7 shows a circulation fluid system in which, according to another exemplary embodiment of the present teachings, an amount of waste heat which is transferrable to the fluid is adjusted by a variation in the flow cross-section of a second valve.

In FIG. 7, the current pressure is maintained by the control unit 17 and for this purpose a flow cross-section of the second valve 41 is changed. For this purpose, a valve motor 43 is connected to the second valve 41. The valve motor 43 may be actuated via the control unit 17. If, for example, the flow cross-section of the second valve 41 is enlarged, the rotational speed of the pump and the volume flow can be increased in order to keep the outlet pressure at the pump 27 constant. That is to say, the larger the throttle cross-section at the valve 41, the higher the hydraulic and thus thermal power transferred to the fluid 21, and the greater the energy 9, 9', 9" introduced into the system overall.

Thus, at suboptimal pressure production operation, the pump 27, which is designed, for example, as a centrifugal pump, transfers more energy 9, 9', 9" overall to the fluid 21 located in the circulation line 13, and prevents the system from freezing. In the event that there is excess heat and the temperature in the circulation line 13 rises, the circulation pump unit 15 may be adjusted towards optimum pressure production, such that overall less energy 9, 9', 9" is transferred into the circulation line 13 or to the fluid 21 located therein. Overall, by the system described herein according to the present disclosure, equalisation between the heat source, such as the circulation pump unit 15, and heat sinks 45 may be achieved such that a system temperature may in general reliably be kept above the freezing point and below a temperature range of from about 12 to about 16° C.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft having a drinking water circulation system comprising:
    a circulation line comprising pipes, wherein the pipes pass in such a vicinity of an outer skin of the aircraft that heat sinks occur in respective regions of the circulation line;
    a circulation pump unit comprising a pump having a bypass conduit between a pump inlet and a pump outlet, a first valve in the bypass conduit, a motor for operating the pump and a frequency converter, wherein the circulation pump unit and the circulation line together form a circulation circuit and the circulation pump unit is configured to transfer an amount of thermal energy at least one of directly and indirectly to a fluid in the form of drinking water located in the circulation line such that a system temperature is kept above a freezing temperature of the fluid and below 16° Celsius; and
    a control unit configured to adjust the amount of thermal energy transferrable as waste heat to the fluid by controlling the efficiency of the circulation pump unit according to at least one of the following:
        adjusting the electric efficiency of the motor;
        actuating the frequency converter in such a way that the frequency converter produces a transferable amount of thermal energy; and
        controlling the first valve to adjust a bypass fluid flow rate through the bypass conduit;
    wherein the control unit adjusts a transferrable amount of thermal energy by operating the circulation pump unit in at least one of a hydraulically or electrically suboptimal range to affect a heating of the circulation pump unit, which heating is transferred as waste heat to the fluid.

2. The aircraft according to claim 1, wherein the control unit adjusts a temperature of the fluid to a predeterminable temperature setpoint value via an adjustable amount of thermal energy.

3. The aircraft according to claim 2, wherein the circulation fluid system further comprises:
    a temperature sensor that determines a current temperature value of the fluid.

4. The aircraft according to claim 3, wherein the control unit compares the current temperature value with the predeterminable temperature setpoint value.

5. The aircraft according to claim 1, wherein a heat exchanger is also provided in the circulation pump unit, and the heat exchanger transmits the transferrable amount of thermal energy from the frequency converter to the fluid.

6. The aircraft according to claim 1, further comprising:
    a second valve provided in the circulation line,
    wherein the control unit adjusts the transferrable amount of thermal energy by controlling a rotational speed of the pump at a constant set pressure of the fluid through the second valve.

7. The aircraft according to claim 1, further comprising:
    a second valve provided in the circulation line,
    wherein the control unit adjusts the transferrable amount of thermal energy by controlling a flow rate of the fluid through the second valve at a constant rotational speed of the pump.

8. The aircraft according to claim 1 further comprising:
    a fluid holding tank;
    wherein the fluid holding tank, the circulation pump unit and the circulation line together form the circulation circuit.

9. A method for thermal optimization of a drinking water circulation fluid system in an aircraft including a circulation line having pipes that pass in the vicinity of an outer skin of the aircraft, the method comprising:
    determining a current temperature value of a fluid located in a circulation fluid system;
    comparing the current temperature value with a predeterminable temperature setpoint value; and
    adjusting an amount of thermal energy which is transferrable to the fluid by a circulation pump unit on the basis of a deviation of the current temperature value from the temperature setpoint value, wherein a control unit is configured to control the efficiency of the circulation pump unit for adjusting a transferrable amount of thermal energy generated by the circulation pump unit according to at least one of the following:
        adjusting the electric efficiency of a motor operating a pump of the circulation pump unit;
        actuating a frequency converter provided in the circulation pump unit such that the frequency converter produces the transferable amount of thermal energy; and controlling a rotational speed of the pump by adjusting a first valve provided in a bypass conduit such that a first quantity of fluid from the circulation circuit is carried in a bypass circuit directly from a pump outlet to a pump inlet;

operating the circulation pump unit with the control unit in at least one of a hydraulically or electrically suboptimal range for heating the circulation pump unit; and transferring heat from the circulation pump unit as waste heat to the fluid.

10. An aircraft having a drinking water circulation system comprising:

a circulation line comprising pipes, wherein the pipes pass in such a vicinity of an outer skin of the aircraft that heat sinks occur in respective regions of the circulation line;

a circulation pump unit comprising a pump having a bypass conduit between a pump inlet and a pump outlet, a first valve in the bypass conduit, a motor for operating the pump and a frequency converter, wherein the circulation pump unit and the circulation line together form a circulation circuit and the circulation pump unit is configured to transfer an amount of thermal energy at least one of directly and indirectly to a fluid in the form of drinking water located in the circulation line; and a control unit configured to adjust the amount of thermal energy transferrable as waste heat to the fluid by controlling the efficiency of the circulation pump unit according to at least one of the following:

adjusting the electric efficiency of the motor;

actuating the frequency converter in such a way that the frequency converter produces a transferable amount of thermal energy; and controlling the first valve to adjust a bypass fluid flow rate through the bypass conduit, and wherein the control unit adjusts a transferrable amount of thermal energy by operating the circulation pump unit in at least one of a hydraulically or electrically suboptimal range to affect a heating of the circulation pump unit, which heating is transferred as waste heat to the fluid.

* * * * *